(12) United States Patent
Liljegren et al.

(10) Patent No.: US 6,779,399 B2
(45) Date of Patent: Aug. 24, 2004

(54) SPRINKLER PERFORMANCE EVALUATION CATCH CUP INCLUDING GROUND PIERCING SUPPORT LEGS

(75) Inventors: Fredrick S. Liljegren, Salt Lake City, UT (US); Michael D. Stuver, Provo, UT (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 10/073,324

(22) Filed: Feb. 13, 2002

(65) Prior Publication Data

US 2003/0150265 A1 Aug. 14, 2003

(51) Int. Cl.[7] ............................................. G01F 19/00
(52) U.S. Cl. ............................. 73/427; 73/426; 73/428
(58) Field of Search ............................. 73/427, 428, 1, 73/3, 170.17; 222/158; 239/63; 285/61

(56) References Cited

U.S. PATENT DOCUMENTS

| | | | | |
|---|---|---|---|---|
| 3,039,304 A | * | 6/1962 | Myers | ..................... 73/170.17 |
| 4,095,744 A | * | 6/1978 | Villelli | ........................... 239/1 |
| 4,171,095 A | * | 10/1979 | Filan et al. | ................. 137/368 |
| 5,044,200 A | * | 9/1991 | Dailey et al. | ................. 73/427 |
| D343,129 S | * | 1/1994 | Farley | ...................... D10/46.2 |
| 5,343,732 A | * | 9/1994 | Glynn | ........................ 73/1.74 |
| 5,839,660 A | * | 11/1998 | Morgenstern et al. | ........ 239/63 |
| 6,263,732 B1 | * | 7/2001 | Hoeting et al. | ............... 73/427 |
| D453,692 S | * | 2/2002 | Addink et al. | ............... D10/52 |
| D461,420 S | * | 8/2002 | Kerman | ..................... D10/46.2 |
| D461,729 S | * | 8/2002 | Addink et al. | ............... D10/56 |
| 6,609,422 B1 | * | 8/2003 | Geschwender | ........... 73/170.22 |

* cited by examiner

*Primary Examiner*—Edward Lefkowitz
*Assistant Examiner*—Alandra Ellington
(74) *Attorney, Agent, or Firm*—Stites & Harbison, PLLC; Ross F. Hunt, Jr.

(57) ABSTRACT

A sprinkler measuring cup device is provided for use in evaluating sprinkler performance. The device is of a one-piece construction and allows measurement of depth of water applied. The measuring device is shaped to allow a plurality of devices to be staked one on top of the other. The device includes a central cup and peripheral ground piercing legs.

20 Claims, 2 Drawing Sheets

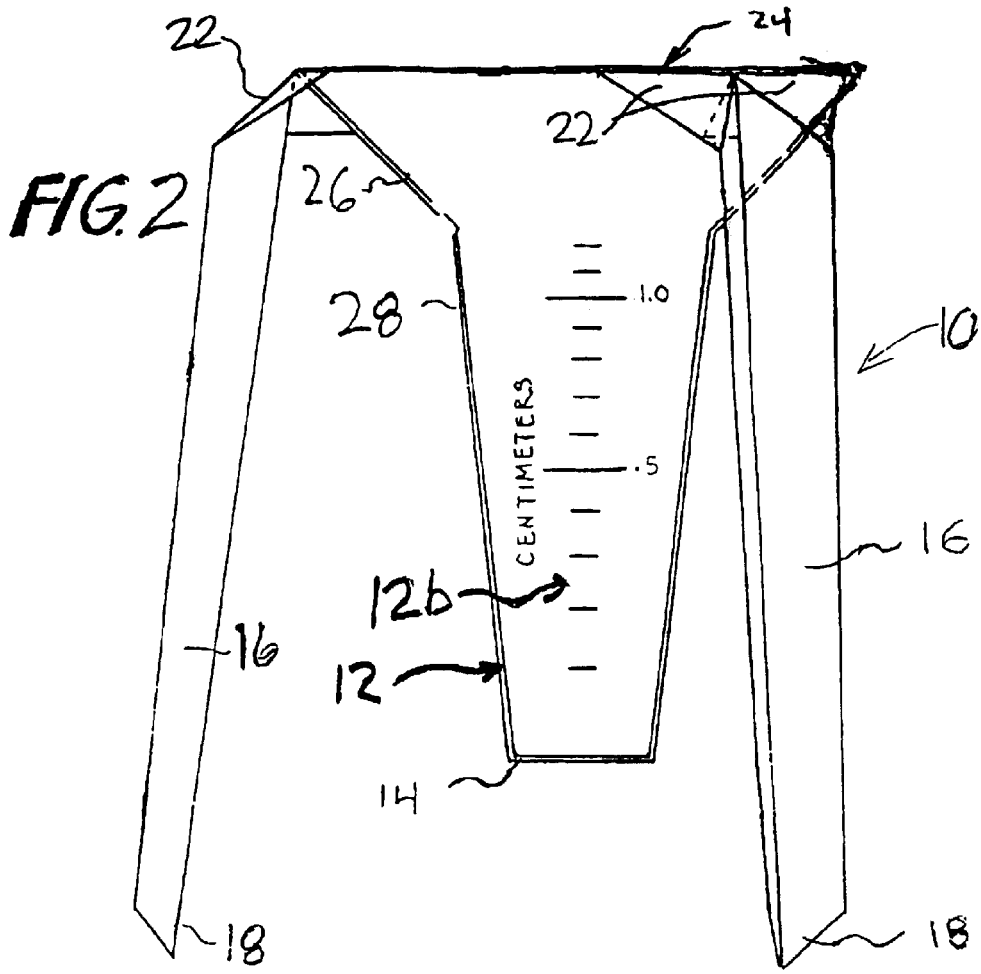
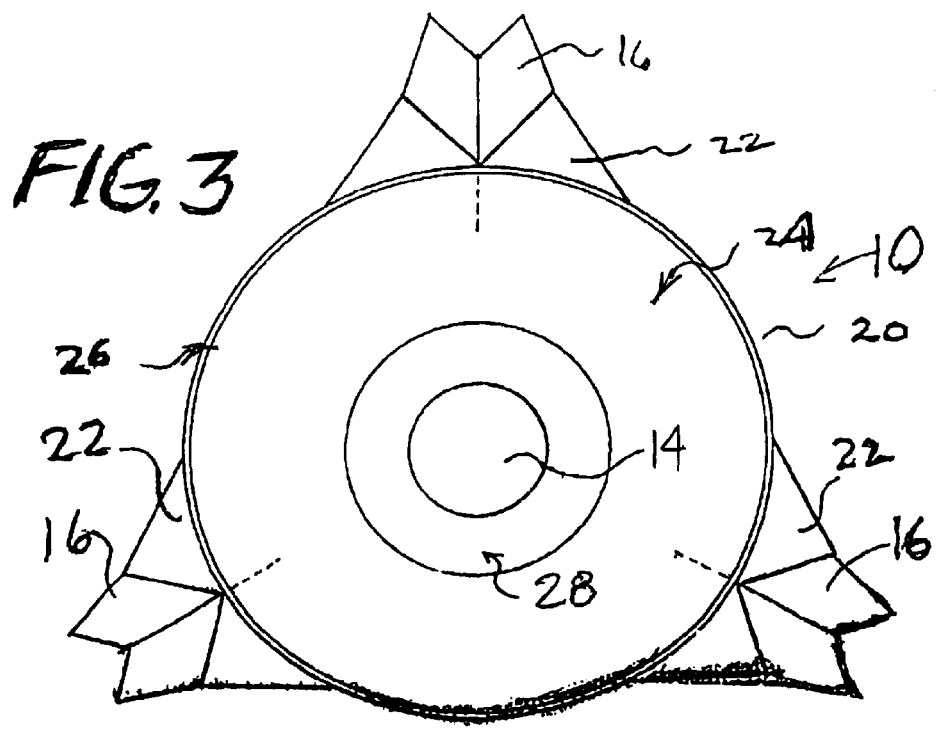

SPRINKLER PERFORMANCE EVALUATION CATCH CUP INCLUDING GROUND PIERCING SUPPORT LEGS

BACKGROUND OF THE INVENTION

1. Field of the Invention

The present invention relates to measuring instruments used in evaluating the performance of water sprinklers. More specifically, the present invention relates to an improved measuring cup device for use in evaluating sprinkler performance.

2. Background of the Invention

Devices for measuring sprinkler performance are used to improve efficiency and to allow adjustment of the sprinkler rate or pattern to insure the proper amount of water is delivered to an area. Generally, these devices are placed in grid patterns over the area where sprinkler performance needs to be evaluated. In some cases, as many as fifty devices may be necessary to properly measure sprinkler performance.

The critical component involved in measuring sprinkler performance is the container or catchment device which captures water from the sprinkler. Typically, these devices consist of two components, a metal ring stand and a plastic cup. One disadvantage of the devices that are presently used is that in order to properly position and arrange these catchment devices, a field technician must first place the metal ring stand down in the ground and then place the plastic cup in the stand. Moreover, in order to retrieve the devices the reverse process is required. Given the large number of devices that must be placed in some areas, the placing and retrieving of these devices can be a time consuming and burdensome task.

Additionally, metal ring stands accidentally left behind have been know to damage mowers and other equipment. Moreover, most conventional measuring cups are calibrated in milliliters, not depth of water applied. Thus, complex calculations may be involved in properly determining sprinkler performance. In some cases calculators or portable computers are necessary to eliminate the chance of mathematical errors.

BRIEF SUMMARY OF THE INVENTION

In accordance with an object of the present invention, a device is provided for evaluating sprinkler performance comprising a one-piece unit with a tri-pod leg construction which allows for easy placement and retrieval.

It is another object of the present invention to provide a measuring device that may be stacked so as to reduce space required for storage and transit.

It is still a further object of the present invention to provide a measuring device which enables measurement of depth of water applied by a sprinkler or sprinkler system.

The measuring device includes a measuring cup with measurement markings along at least one side and a closed bottom. A plurality of legs, formed integrally with the measuring cup, extend beyond the bottom end of the cup and support the device in an upright position in the ground. The legs include pointed end portions which allow the legs to be stuck into the ground to support the device.

In a preferred embodiment, the cup is tapered in shape and has a smaller end terminating at the closed bottom. Preferably, the cup has a first and second tapered potion. Advantageously, the first and second tapered portions are annular in cross section. In an advantageous implementation, the cup has measurement markings along both its sides, which preferably are in inches or centimeters. Preferably, the cup further includes a plurality of flanges which extend outward from the annular edge at equally spaced locations therearound, and the legs are formed integrally with the flanges.

In accordance with another aspect of the present invention, a stackable measuring device is provided which includes a tapered vessel with an angled side wall. The angled side wall includes measurement markings therealong. The vessel has an open top, a plurality of flanges which extend outwardly from the top, and a closed bottom. A plurality of legs which are formed Integrally with the vessel extend downwardly from the flanges of the vessel beyond the bottom. The legs and vessel are shaped to allow the device to be stacked on a further device.

Further features and advantages of the present invention will be set forth in, or are apparent from, the detailed description of preferred embodiments which follows.

BRIEF DESCRIPTION OF THE DRAWING

The invention will now be described in detail with respect to a preferred embodiment thereof with reference to the accompanying drawings, wherein:

FIG. 2 is a side elevational view of the measuring device of FIG. 1; and

FIG. 3 is a top plan view of the measuring device from FIG. 1.

DETAILED DESCRIPTION OF THE INVENTION

Figure 1:
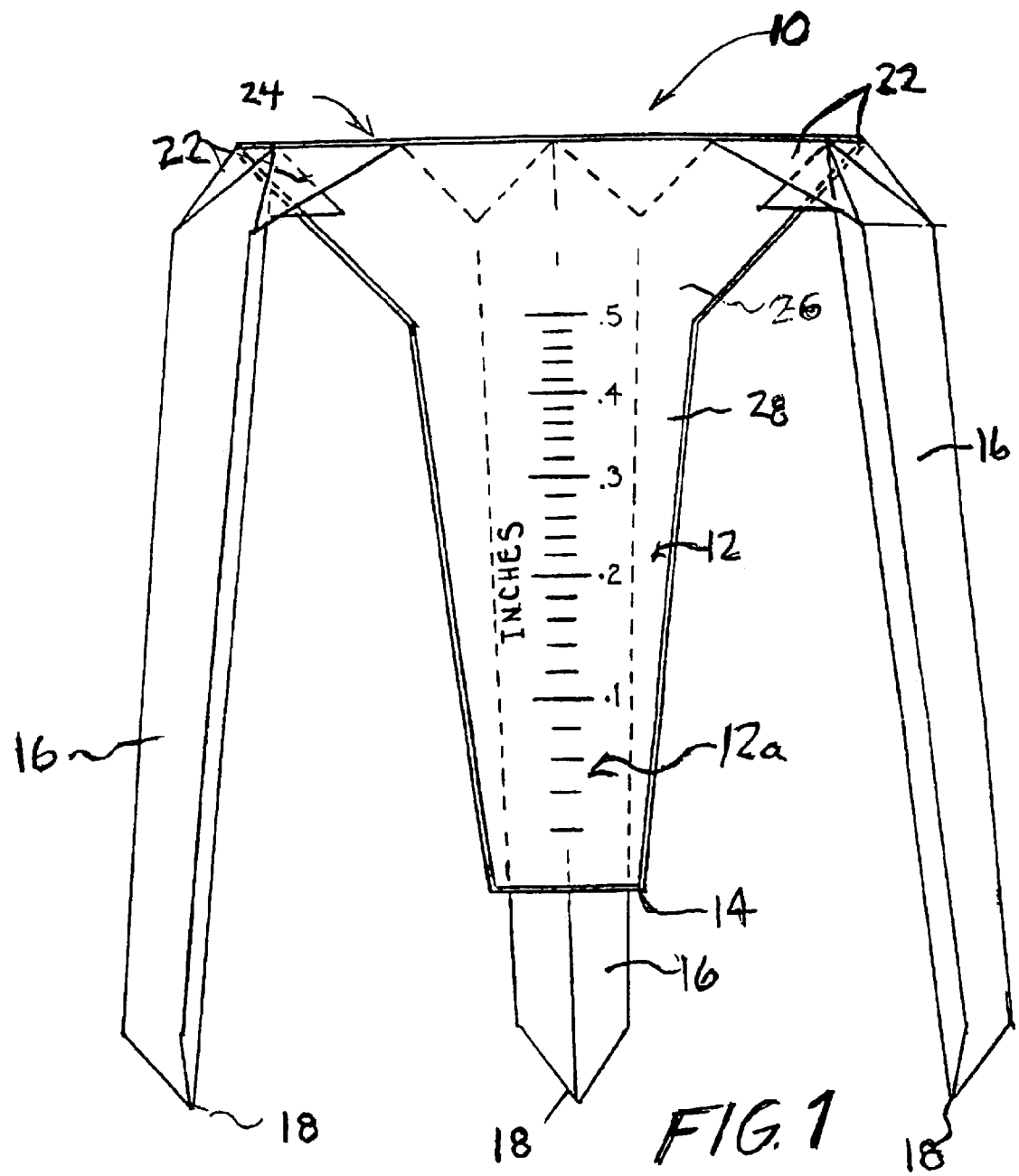
FIG. 1 is a front elevational view of a measuring device in accordance with a preferred embodiment of the invention.

Referring to the drawings, wherein like numbers represent like elements throughout the several views, and referring particularly to FIG. 1, a plastic measuring cup device, generally denoted 10, includes a cup member 12 having measurement markings thereon, denoted 12a in FIG. 1, a closed bottom 14. Cup 10 includes a first tapered portion 26, and a second tapered portion 28 (best seen in FIG. 2) and has an open top 24 defined by an annular upper edge 20 (best seen in FIG. 3) in which water is received. The measurement markings 12a extend vertically down along the side of the measuring cup 12 and are arranged so as to indicate the depth of water collected. The measurement markings may extend down either one or both sides of the measuring cup 12 and, in the preferred embodiment illustrated in the drawings, two sets of markings, denoted 12a and 12b, are provided, as shown in FIGS. 1 and 2, respectively, which are calibrated in inches and centimeters, respectively.

The measuring cup device 10 also includes a plurality of legs 16. In the preferred embodiment illustrated in the drawings, three legs 16 are provided. As can be seen from FIG. 1, the legs 16 are formed integrally with the cup 10 and, as shown, the legs 16 extend downwardly from integral flanges 22 (best seen in FIG. 2) which extend outwardly from the annular edge 20 at the open top 24 of cup 12.

In the illustrated embodiment, the legs 16 are of a V-shaped cross section formed by first and second angled portions thereof. The legs 16 each terminate in a pointed end portion 18 which enable the legs 16 to be readily stuck in the ground.

The flanges 22 are spaced radially around the annular edge 20 and are preferably spaced equidistantly apart from one another. The flanges 22 terminate in V-shaped edges joined to legs 16. The legs 16 extend downwardly from the flanges 22 beyond the bottom surface 14 of cup 12 (see FIG. 1).

Although the invention has been described in detail with respect to preferred embodiments thereof, it will be apparent to one skilled in the art that the invention is capable of numerous modifications and variations within the spirit and scope of the invention.

What is claimed is:

1. A measuring cup device for use with a water sprinkler in evaluating sprinkler performance, said device comprising:

a measuring cup including measurement markings along at least one side thereof and a closed bottom end; and a plurality of legs, formed integrally with said cup and extending beyond the bottom end of said cup, for supporting the device in an upright position in the ground, said legs including pointed end portions for enabling the legs to be stuck into the ground to support the device, said cup and said legs being of a shape permitting stacking of said device on a further said device such that the cup of said device is disposed in the corresponding cup of the further said device and the legs of said device are disposed on the corresponding legs of the further said device.

2. The device of claim 1 wherein said cup is of a tapered shape having a smaller end terminating at said closed bottom.

3. The device of claim 1 wherein said cup comprises a first tapered portion having a first taper and a second tapered portion having a second, different taper.

4. The device of claim 3 wherein said first and second portions are both annular in cross section.

5. The device of claim 1 wherein said cup has measurement markings along two sides thereof.

6. The device of claim 5 wherein the measurement markings comprise inches and centimeters, respectively.

7. The device of claim 1 wherein said cup includes an annular edge defining an opening at an end of said cup opposite to said closed end.

8. The device of claim 7 wherein said cup includes a plurality of flanges extending outwardly from said annular edge at equally spaced locations therearound and wherein said legs are formed integrally with said flanges.

9. The device of claim 8 wherein said legs are of a V-shaped confirmation in cross section and comprise first and second angled portions joined along a common edge.

10. The device of claim 9 wherein said angled portions of each of said legs terminate in slanted end portions forming the pointed end portion of the corresponding leg.

11. A stackable device for measuring sprinkler performance, said device comprising:

a tapered vessel having an angled side wall including measurement markings therealong, an open top, a plurality of flanges extending outwardly from said top, and a closed bottom, and a plurality of legs, formed integrally with said vessel and extending downwardly from said flanges substantially beyond said bottom, for supporting the device, said legs including channels therein and said vessel and said legs being of such a shape that said device can be stacked on a further said device with the cup of said device being received in the corresponding cup of the further said device and the channels of the legs of said device being received in the corresponding channels of the legs of the further said device.

12. The device of claim 11 wherein the channels of said legs have a v-shaped cross section.

13. The device of claim 11 wherein said open top is defined by an annular edge portion of said vessel.

14. The device of claim 11 wherein said device is composed of plastic.

15. The device of claim 11 wherein said measurement markings comprise first and second sets of measurement markings extending along different sides of said tapered vessel for measurement of vessel contents in inches and centimeters.

16. A stackable device for evaluating the performance of a water sprinkler, said device comprising:

a central tapered cup for catching water from a sprinkler and including depth measurement markings along at least one side thereof for measuring the depth of the water caught in said cup;

said cup including a top edge and three integral flanges equally spaced around the top edge and expanding radially outwardly therefrom, said flanges defining a V-shaped terminal edge; and three legs each formed integrally with one of said flanges and extending downwardly from the corresponding terminal edge so as to define a V-shaped channel, said legs terminating in a pointed end portion for enabling the legs to be stuck into a supporting ground surface.

17. A device as claimed in claim 1 wherein said cup has an open top and is of greatest cross-sectional area at said open top.

18. A device as claimed in claim 11 wherein said cup has an open top and is of greatest cross-sectional area at said open top.

19. A device as claimed in claim 16 wherein said cup has an open top and is of greatest cross-sectional area at said open top.

20. A measuring cup device for use with a water sprinkler in evaluating sprinkler performance, said device comprising:

a measuring cup including measurement markings along two sides thereof and a closed bottom end; and a plurality of legs, formed integrally with said cup and extending beyond the bottom end of said cup, for supporting the device in an upright position in the ground, said legs including pointed end portions for enabling the legs to be stuck into the ground to support the device.

* * * * *